United States Patent
Min et al.

(10) Patent No.: US 9,535,483 B2
(45) Date of Patent: Jan. 3, 2017

(54) ADAPTIVELY DISABLING AND ENABLING SLEEP STATES FOR POWER AND PERFORMANCE

(71) Applicant: Intel Corporation, Santa Clara, CA (US)

(72) Inventors: Alexander W. Min, Portland, OR (US); Ren Wang, Portland, OR (US); Jr-Shian Tsai, Portland, OR (US); Tsung-Yuan Tsung-Yuan Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 558 days.

(21) Appl. No.: 13/719,880

(22) Filed: Dec. 19, 2012

(65) Prior Publication Data

US 2014/0173314 A1    Jun. 19, 2014

(51) Int. Cl.
    *G06F 1/32* (2006.01)
(52) U.S. Cl.
    CPC .................. *G06F 1/3206* (2013.01)
(58) Field of Classification Search
    None
    See application file for complete search history.

(56) References Cited

U.S. PATENT DOCUMENTS

| | | | |
|---|---|---|---|
| 6,230,274 B1 | 5/2001 | Stevens et al. | |
| 2003/0196127 A1 | 10/2003 | Olsen | |
| 2009/0285142 A1* | 11/2009 | Zhang et al. | 370/311 |
| 2010/0332876 A1 | 12/2010 | Fields, Jr. et al. | |
| 2011/0040995 A1* | 2/2011 | Basak et al. | 713/324 |
| 2012/0151235 A1 | 6/2012 | Nasrullah et al. | |
| 2012/0173782 A1 | 7/2012 | Frantz et al. | |
| 2012/0191995 A1* | 7/2012 | Naveh | G06F 1/3203 713/320 |
| 2012/0210032 A1 | 8/2012 | Wang et al. | |
| 2013/0205155 A1 | 8/2013 | Yang et al. | |

FOREIGN PATENT DOCUMENTS

| | | |
|---|---|---|
| CN | 1415085 A | 4/2003 |
| CN | 102725997 A | 10/2012 |
| EP | 1127307 B1 | 5/2006 |
| EP | 1228413 B1 | 5/2011 |
| TW | 201243572 A1 | 11/2012 |
| WO | 2014098995 | 6/2014 |

OTHER PUBLICATIONS

International Search Report and Written Opinion received for PCT Patent Application No. PCT/US2013/047232, mailed on Sep. 27, 2013, 11 pages.
European Search Report for European Patent Application No. 13866299.4, mailed Jun. 16, 2016, 8 pages.

* cited by examiner

*Primary Examiner* — Kim Huynh
*Assistant Examiner* — Vincent Chang
(74) *Attorney, Agent, or Firm* — Jordan IP Law, LLC

(57) ABSTRACT

Methods and systems may provide for determining whether a runtime disablement condition is met with respect to a sleep state and disabling the sleep state if the runtime disablement condition is met. Additionally, the sleep state may be enabled if a runtime reinstatement condition is met. In one example, determining whether the runtime disablement condition is met includes determining a false entry rate for the sleep state, and comparing the false entry rate to an energy-based threshold, wherein the sleep state is disabled if the false entry rate exceeds the energy-based threshold.

30 Claims, 3 Drawing Sheets

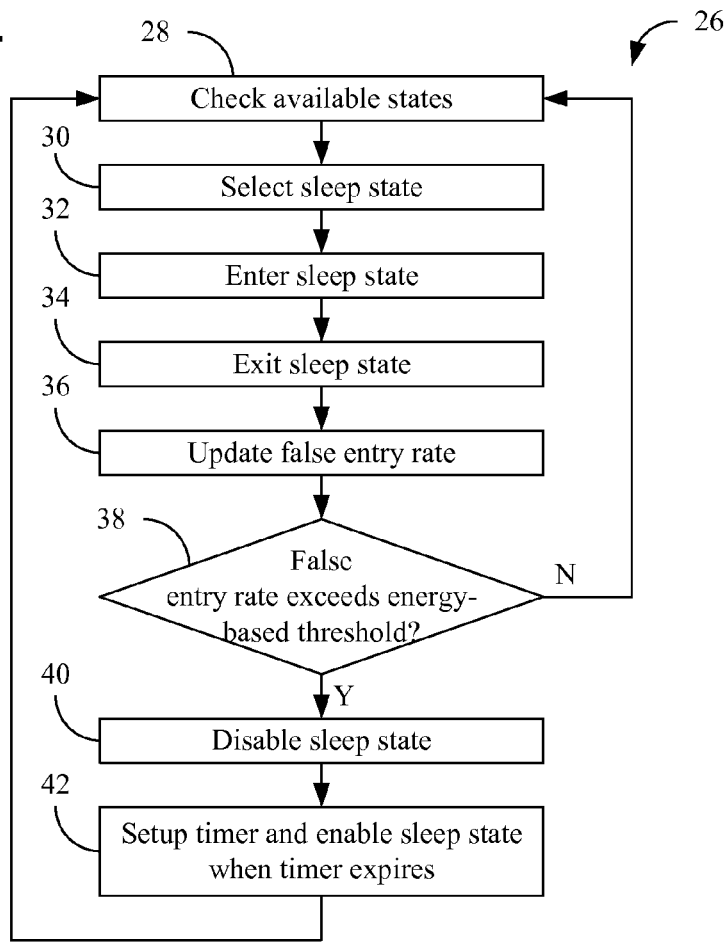
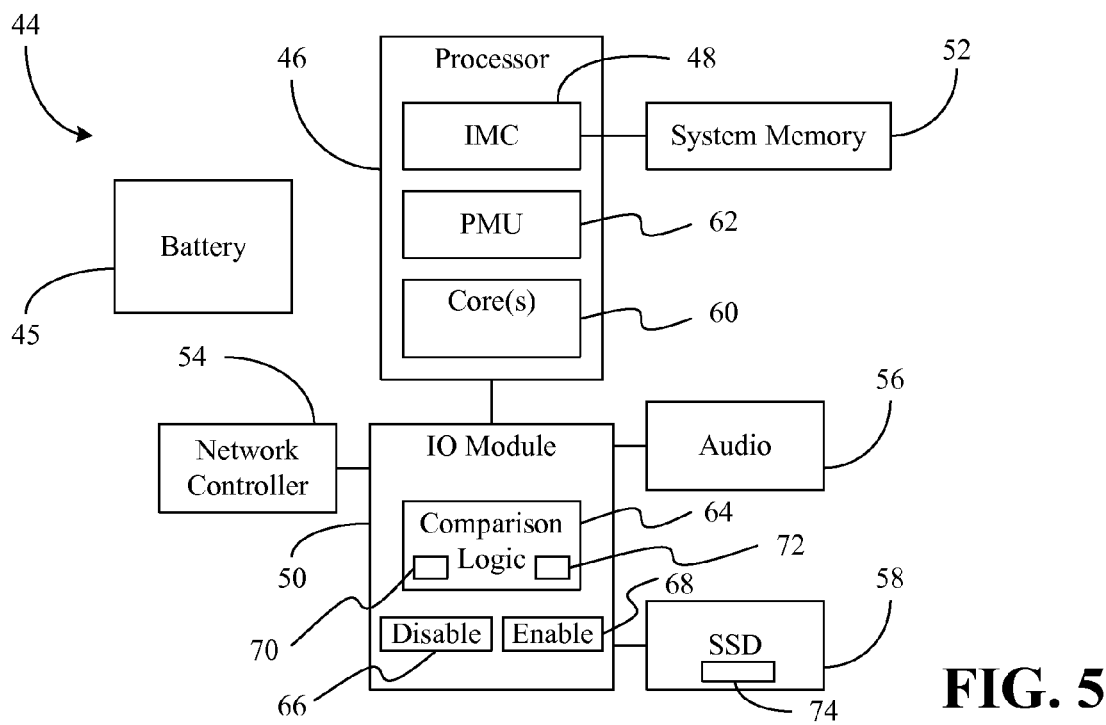

ADAPTIVELY DISABLING AND ENABLING SLEEP STATES FOR POWER AND PERFORMANCE

BACKGROUND

Technical Field

Embodiments generally relate to power management in computing platforms. More particularly, embodiments relate to adaptively disabling and enabling sleep states for power and performance.

Discussion

In order to reduce power consumption, mobile devices may opportunistically enter central processing unit (CPU)/platform low-power sleep states when the CPU becomes idle. For example, conventional mobile devices may be equipped with multiple CPU and platform sleep states (e.g., "Cx" and "S0ix" states, respectively), wherein the sleep states have different characteristics in terms of power, exit latency, and energy break-even time. Therefore, the ability of the device to maximally benefit from the presence of multiple sleep states may depend upon the ability of the device to select optimal sleep states at runtime.

Current sleep-state selection algorithms in the Linux family of operating systems (e.g., UNIX®, Solaris, FreeBSD®, etc.) may largely rely on predicted idle durations. It can be very difficult, however, to accurately predict idle durations for active mobile workloads. As a result, inaccurate idle duration predictions may often cause mobile devices to enter sleep states that are too deep, and as a consequence, wake up the CPU/platform before the energy break-even times of the selected states expire. Such "false entries" can result in even higher power consumption compared to staying in the active state. Too frequent false entries may therefore offset the potential power savings from entering low-power states, and ironically, even cause a net energy loss.

BRIEF DESCRIPTION OF THE DRAWINGS

The various advantages of the embodiments of the present invention will become apparent to one skilled in the art by reading the following specification and appended claims, and by referencing the following drawings, in which:

FIG. 4 is a flowchart of an example of a method of using false entry rates and an energy-based threshold to adaptively disable and enable sleep states at runtime according to an embodiment; and FIG. 5 is a block diagram of an example of a mobile platform according to an embodiment.

DETAILED DESCRIPTION

Reducing platform power consumption to extend battery life can be particularly advantageous for small form factor platforms with active workloads, such as smartphones and tablets. A number of processors and/or platforms may provide multiple low-power sleep states (e.g., Cx, S0ix), wherein deeper sleep states can typically consume less power but may require more time to enter and exit the sleep states. Ensuring efficient use of sleep states may therefore be a key to power management, particularly in platforms having a wide variety of interrupts that can cause sleep state exits. As will be discussed in greater detail, an enhanced approach to sleep state selection may involve adaptively disabling and enabling sleep states for power and performance considerations. More particularly, identifying the likelihood of false entry into a given sleep state may provide unique opportunities to selectively disable sleep states on that basis, wherein such disablement can ultimately lead to optimal operation from both a power consumption and a performance standpoint.

Figure 1:
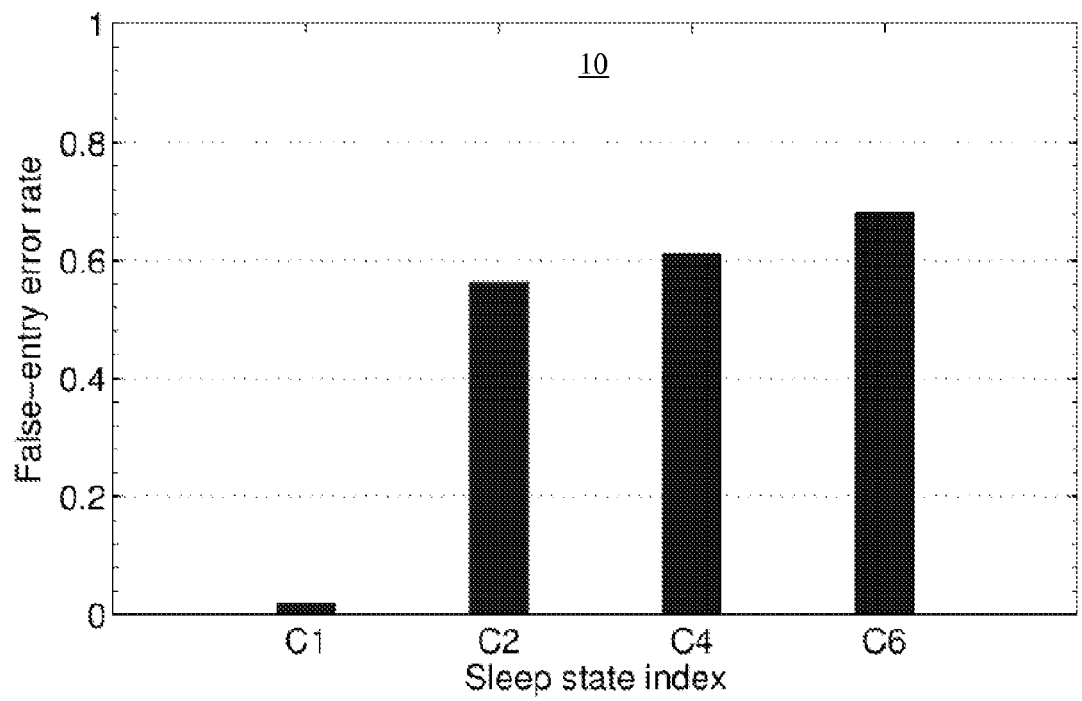
FIG. 1 is a chart of an example of false entry error rates for a plurality of sleep states according to an embodiment.

For example, FIG. 1 shows a chart 10 of false entry error rates for a plurality sleep states ("C1", "C2", "C4", "C6"). The C1 sleep state may be the shallowest sleep state, wherein the C6 sleep state may be the deepest sleep state. In general, deeper sleep states may provide greater power savings than shallower sleep states, but may also require longer residence in the sleep state in order to justify longer latencies associated with entry into and exit from the sleep state (e.g., longer "energy break-even time" or "EBT"). Active workloads, however, may force the processor out of the selected sleep state before its energy break-even time is met. Accordingly, the chart 10 demonstrates that states deeper than the C1 state may be falsely entered over 50% of the time.

Figure 2:
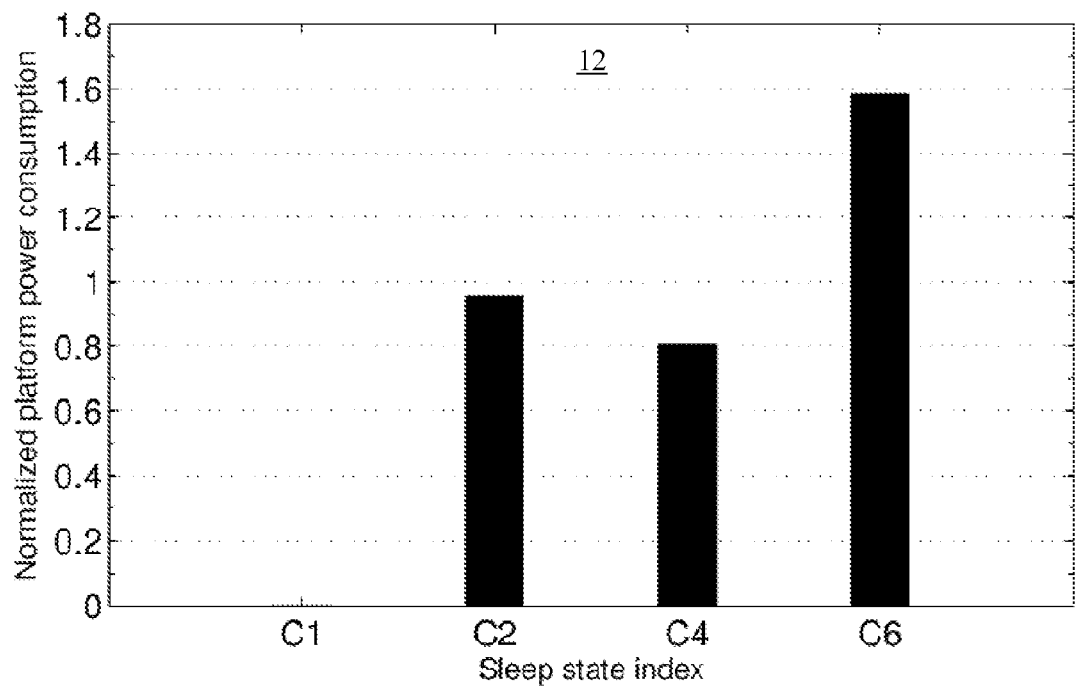
FIG. 2 is a chart of an example of normalized platform power consumption for a plurality of sleep states according to an embodiment.

Additionally, FIG. 2 shows a chart 12 of platform power consumption for a plurality of sleep states, wherein the power consumption values have been normalized against the active state ("C0"). In the illustrated example, the states deeper than the C1 state approach the same amount of power consumption as the active state, with the deepest sleep state ("C6") actually having greater power consumption than the active state. False entry of the sleep states may be a primary contributor to the increased power consumption demonstrated in the chart 12. As will be discussed in greater detail, selectively disabling sleep states that have a high likelihood of false entry at runtime can provide significant improvements with regard to power conservation, battery life and performance. While certain examples herein may refer to ACPI (Advanced Configuration and Power Interface, e.g., ACPI Specification, Rev. 4.0a, Apr. 5, 2010) low-power states, other low-power states may also be used.

Figure 3A:
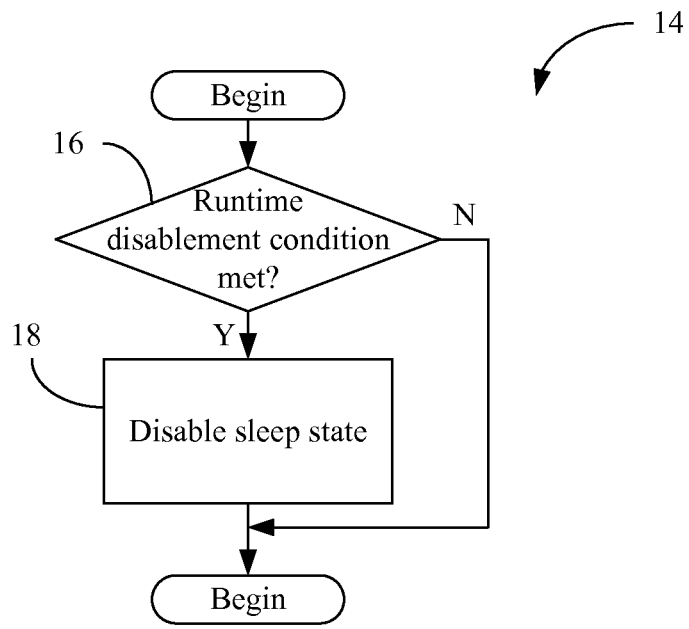
FIG. 3A is a flowchart of an example of a method of disabling a sleep state at runtime according to an embodiment.

FIG. 3A shows a method 14 of disabling a sleep state at runtime. The method 14 may be implemented as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 14 may be written in any combination of one or more programming languages, including an object oriented programming language such as Java, Smalltalk, C++ or the like and conventional procedural programming languages, such as the "C" programming language or similar programming languages.

Illustrated processing block 16 provides for determining whether a runtime disablement condition is met with respect to a sleep state. The runtime disablement condition may include, for example, a false entry rate of the sleep state exceeding an energy-based threshold, an interrupt frequency for the sleep state (e.g., the frequency at which interrupts arrive while the platform component is in the sleep state) exceeding an interrupt threshold, a latency for the sleep state (e.g., the amount of time/cycles it takes the platform component to exit the sleep state once it is prompted to do so) exceeding a latency threshold, etc., or any combination thereof. If the runtime disablement condition is met and/or satisfied, block 18 may disable the sleep state. The sleep state may be disabled by, for example, changing one or more register settings, sending a message to an operating system (OS) component, and so forth. Disabling the sleep state can eliminate the sleep state from contention as a selected state and therefore reduce the likelihood that a false entry will occur.

Figure 3B:
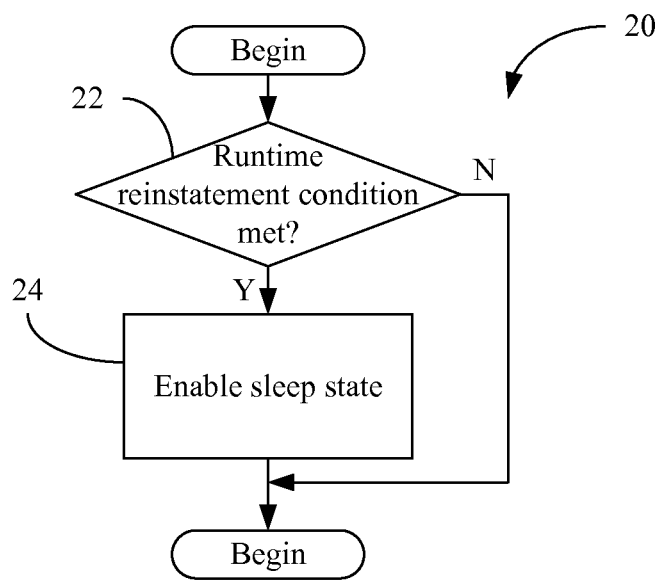
FIG. 3B is a flowchart of an example of a method of enabling a sleep state at runtime according to an embodiment.

FIG. 3B shows a method 20 of enabling a sleep state at runtime. The method 20 may be implemented as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof, as already noted. Illustrated processing block 22 provides for determining whether a runtime reinstatement condition is met with respect to a sleep state. The runtime reinstatement condition may include, for example, a timer for the sleep state expiring, an interrupt frequency for the sleep state falling below a reinstatement threshold, a particular workload being completed, etc., or any combination thereof. If the runtime reinstatement condition is met and/or satisfied, block 24 may enable the sleep state. The sleep state may be enabled by, for example, changing one or more register settings, sending a message to an OS component, and so forth, as appropriate. Enabling the sleep state can place the sleep state back into contention as a selected sleep state and therefore increase the likelihood that an optimal sleep state is selected.

FIG. 4 shows a method 26 of using false entry rates and an energy-based threshold to adaptively disable and enable sleep states at runtime. The method 20 may be implemented as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof, as already noted. Illustrated processing block 28 provides for checking the available states to identify one or more candidate sleep states. A sleep state may be selected at block 30, wherein illustrated block 32 enters the selected sleep state. The selected sleep state may be exited at block 34, wherein illustrated block 36 updates the false entry rate for the selected sleep state.

In this regard, the false entry rate for a given sleep state may be obtained by determining the ratio of false entries into the sleep state to total entries into the sleep state over a certain historical period. Use of a historical period can enable recent trends of false entry behavior to be reflected without undue reliance on transient behavior. Such an approach may be effective, particularly if the historical period is workload dependent (e.g., takes into consideration the same and/or similar workloads). Thus, the update at block 36 might include a determination as to whether the time spent in the sleep state exceeded the target residency (e.g., EBT) of the sleep state, wherein if not, the entry into the sleep state can be flagged as a false entry.

A determination may be made at block 38 as to whether the false entry rate exceeds an energy-based threshold. The energy-based threshold, which may be referred to as an "energy break-even false entry threshold" ("EBFT"), can be a design time parameter that is decided based on platform and processor characteristics. In general, the energy-based threshold can provide a metric to determine whether entering a sleep state can save power compared to staying in the active state. More particularly, an EBFT for sleep state "i" may be derived as follows, $$P_{FE,i} \times Pow_{FE,i} + (1-P_{FE,i}) \times Pow_{\overline{FE},i} < Pow_{on} \qquad (1)$$

where $P_{FE,i}$ is the false entry rate of sleep state "i", $POW_{FE,i}$, and $POW_{\overline{FE},i}$ are the average power consumption (per unit time) for false and correct entries, respectively, and $POW_{on}$ is the average power in the active state (e.g., C0). Note that here the index "i" is used to represent any sleep state such as, for example, a CPU (e.g., Cx) state, a platform (e.g., S0ix) state, and so forth.

The EBFT may then be defined as the threshold probability where the power consumption from entering the sleep state "i" becomes the same as the active state power ($POW_{on}$). Therefore, EBFT can be derived by equating both sides of expression (1). That is, $$P_{FE,i} \times (Pow_{FE,i} - Pow_{\overline{FE},i}) < Pow_{on} - Pow_{\overline{FE},i} \qquad (2)$$
$$\rightarrow EBFT_i = P_{FE,i} = \frac{POW_{on} - POW_{\overline{FE},i}}{POW_{FE,i} - POW_{\overline{FE},i}}$$

Assuming that the power consumption from false entry is higher than the active state power consumption (i.e., $POW_{FE,i} > POW_{\overline{FE},i}$), $EBFT_i$ may always be less than one. Expression (2) also indicates that the higher the power penalty from false entry ($POW_{FE,i}$), the lower the threshold. Such a phenomenon may be intuitively correct, since a higher power cost can make the platform less tolerable from a false entry, hence lowering the false entry threshold.

Table I below demonstrates one example of a lookup table that may be constructed based on expression (2) to facilitate runtime determinations of energy-based thresholds as described herein.

TABLE I

| State | $POW_{\overline{FE}}$ (mW) | $POW_{FE}$ (mW) | EBFT |
|---|---|---|---|
| C0 | 245.9 | N/A | N/A |
| C1 | 225.4 | 491.8 | 0.078 |
| C2 | 202.7 | 491.8 | 0.149 |
| C4 | 194.1 | 491.8 | 0.174 |
| C6 | 93.2 | 491.8 | 0.383 |
| S0i1 | 1.6 | 491.8 | 0.498 |
| S0i3 | 0.3 | 491.8 | 0.500 |

Of particular note is that the power consumption of all falsely entered sleep states (491.8 mW) is much greater than the power consumed when the platform correctly stays in the active state (245.9 mW), in the illustrated example. To minimize power consumption and prevent potential energy loss from false entries, the platform may disable a sleep state when its false entry rate exceeds the EBFT value. For example, when the false entry rate of the C6 state is greater than 0.383, the platform may disable the C6 state because the expected power consumption from entering the C6 state is greater than the average power consumption in the active state. The values shown are to facilitate discussion only. Moreover, the examples provided may be applicable to any processor, computer system, component, device, etc., or any combination thereof.

Thus, if it is determined at block 38 that the energy-based threshold is exceeded, illustrated block 40 provides for disabling the sleep state, wherein a timer may be setup at block 42 in order to determine when to reinstate the sleep state. Thus, when the timer expires, the sleep state may be enabled, in the illustrated example. Other conditions may also be used to determine when to reinstate sleep states. For example, the sleep state could be enabled if an interrupt frequency falls below a particular reinstatement threshold, if a current workload has been completed, and so forth.

Turning now to FIG. 5, a platform 44 is shown. The platform 44 may be part of a mobile device having computing functionality (e.g., personal digital assistant/PDA, laptop, smart tablet), communications functionality (e.g., wireless smart phone), imaging functionality, media playing functionality (e.g., smart television/TV), or any combination thereof (e.g., mobile Internet device/MID). In the illustrated example, the platform 44 includes a battery 45, a processor 46, an integrated memory controller (IMC) 48, an input output (IO) module 50, system memory 52, a network controller (e.g., network interface card) 54, an audio IO device 56 and a solid state disk (SSD) 58. The processor 46, which may include a core region with one or several processor cores 60, may use a power management unit (PMU) 62 to place its cores 60 and other platform components into one or more active and/or sleep states based on performance and/or power management concerns, as already noted.

The illustrated IO module 50, sometimes referred to as a Southbridge or South Complex of a chipset, functions as a host controller and communicates with the network controller 54, which could provide off-platform communication functionality for a wide variety of purposes such as, for example, cellular telephone (e.g., W-CDMA (UMTS), CDMA2000 (IS-856/IS-2000), etc.), WiFi (Wireless Fidelity, e.g., Institute of Electrical and Electronics Engineers/IEEE 802.11-2007, Wireless Local Area Network/LAN Medium Access Control (MAC) and Physical Layer (PHY) Specifications), 4G LTE (Fourth Generation Long Term Evolution), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. The IO module 50 may also include one or more wireless hardware circuit blocks to support such functionality.

The SSD 58 may include one or more NAND (negated AND) chips and might be used to provide high capacity data storage and/or a significant amount of parallelism. There may also be solutions that include NAND controllers implemented as separate ASIC controllers being connected to the IO module 50 on standard buses such as a Serial ATA (SATA, e.g., SATA Rev. 3.0 Specification, May 27, 2009, SATA International Organization/SATA-IO) bus, or a PCI Express Graphics (PEG, e.g., Peripheral Components Interconnect/PCI Express x16 Graphics 150W-ATX Specification 1.0, PCI Special Interest Group) bus. The SSD 58 could also be used as a USB (Universal Serial Bus, e.g., USB Specification 3.0, USB Implementers Forum) flash storage device.

The illustrated IO module 50 includes comparison logic 64 that is configured to determine whether a runtime disablement condition is met with respect to a sleep state, disablement logic 66 to disable the sleep state if the runtime disablement condition is met, and enablement logic 68 to enable the sleep state if a runtime reinstatement condition is met. In one example, the comparison logic 64 is configured to determine a false entry rate for the sleep state and compare the false entry rate to an energy-based threshold to determine whether the runtime disablement condition is met, wherein the sleep state is to be disabled if the false entry rate exceeds the energy-based threshold. Moreover, the comparison logic 64 may include a ratio module 70 to determine a ratio of false entries into the sleep state to total entries into the sleep state over a historical period to determine the false entry rate. The comparison logic 64 may also include a prediction module 72 to predict the false entry rate based at least in part on a previous interrupt arrival pattern. The illustrated SSD 58 stores a lookup table 74 such as, for example the Table I, already discussed, wherein the comparison logic 64 may obtain the energy-based threshold from the lookup table 74.

The comparison logic 64 could also be configured to determine an interrupt frequency for the sleep state and compare the interrupt frequency to an interrupt threshold to determine whether the runtime condition is met, wherein the sleep state is to be disabled if the interrupt frequency exceeds the interrupt threshold. Additionally, the comparison logic 64 may determine a latency for the sleep state and compare the latency to a latency threshold to determine whether the runtime disablement condition is met, wherein the sleep state is to be disabled if the latency exceeds the latency threshold. Other parameters and/or conditions may also be used to determine whether to disable a particular sleep state. As already noted, the enablement logic 68 may be configured to enable a particular sleep state if a timer has expired, an interrupt frequency falls below a reinstatement threshold, a workload has been completed, and so forth.

The comparison logic 64, disablement logic 66 and/or enablement logic 68 may be implemented elsewhere in the platform 44 such as, for example, on the processor 46. Moreover, although the processor 46 and IO module 50 are illustrated as separate blocks, the processor 46 and IO module 50 may be implemented as a system on chip (SoC) on the same semiconductor die. The comparison logic 64, disablement logic 66 and enablement logic 68 may therefore reduce power consumption for the platform and in turn extend the life of the battery 45, while maintaining high performance levels for active workloads.

Thus, techniques described herein may prevent potential energy losses associated with false entries occurring too frequently, while more efficiently using sleep states with low selection error rates. As a result, mobile platforms can achieve higher net power savings on average, with improved system performance due to reduced resume latencies.

Embodiments may therefore provide for a method in which a determination is made as to whether a runtime disablement condition is met with respect to a sleep state. The method can also involve disabling the sleep state if the runtime disablement condition is met, and enabling the sleep state if a runtime reinstatement condition is met.

Embodiments may also include at least one machine readable storage medium having a set of instructions which, if executed by at least one processor, cause a computer to determine whether a runtime disablement condition is met with respect to a sleep state. The instructions, if executed, may also cause a computer disable the sleep state if the runtime disablement condition is met, and enable the sleep state if a runtime reinstatement condition is met.

Embodiments may also include an apparatus having comparison logic to determine whether a runtime disablement condition is met with respect to a sleep state, and disablement logic to disable the sleep state if the runtime disablement condition is met. Additionally, the apparatus may have enablement logic to enable the sleep state if a runtime reinstatement condition is met.

Embodiments may also include a mobile platform having a battery to provide power to the mobile platform, and an input output (IO) module with comparison logic to determine whether a runtime disablement condition is met with respect to a sleep state. The IO module may also include disablement logic to disable the sleep state if the runtime disablement condition is met, and enablement logic to enable the sleep state if a runtime reinstatement condition is met.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A mobile platform comprising:
    a battery to provide power to the mobile platform; and
    an input output (IO) module including,
        comparison logic to determine whether a runtime disablement condition is met with respect to a sleep state of the mobile platform, wherein the runtime disablement condition is based on one or more of a false entry rate for the sleep state, an interrupt frequency for the sleep state, or a latency for the sleep state, and wherein the sleep state is selected from one of a plurality of sleep states having different levels that range from shallow to deep,
        disablement logic to adaptively disable the sleep state if the runtime disablement condition is met, wherein disabling the sleep state is to remove the sleep state from contention as a selected sleep state to reduce the likelihood that a false entry will occur, and
        enablement logic to adaptively enable the sleep state if a runtime reinstatement condition is met, wherein enabling the sleep state is to place the sleep state into contention as a selected sleep state to increase the likelihood that an optimal sleep state is selected.

2. The mobile platform of claim 1, wherein the comparison logic is to,
    determine a false entry rate for the sleep state, and
    compare the false entry rate to an energy-based threshold to determine whether the runtime disablement condition is met, wherein the sleep state is to be disabled if the false entry rate exceeds the energy-based threshold.

3. The mobile platform of claim 2, wherein the comparison logic includes a ratio module to determine a ratio of false entries into the sleep state to total entries into the sleep state over a historical period to determine the false entry rate.

4. The mobile platform of claim 2, wherein the comparison logic includes a prediction module to predict the false entry rate based at least in part on a previous interrupt arrival pattern.

5. The mobile platform of claim 2, further including a memory to store a lookup table, wherein the comparison logic is to obtain the energy-based threshold from the lookup table.

6. The mobile platform of claim 1, wherein the comparison logic is to,
    determine an interrupt frequency for the sleep state, and
    compare the interrupt frequency to an interrupt threshold to determine whether the runtime disablement condition is met, wherein the sleep state is to be disabled if the interrupt frequency exceeds the interrupt threshold.

7. The mobile platform of claim 1, wherein the comparison logic is to,
    determine a latency for the sleep state, and
    compare the latency to a latency threshold to determine whether the runtime disablement condition is met, wherein the sleep state is to be disabled if the latency exceeds the latency threshold.

8. The mobile platform of claim 1, wherein the sleep state is to be enabled if one or more of a timer has expired, an interrupt frequency falls below a reinstatement threshold, and a workload has been completed.

9. The mobile platform of claim 1, further including a processor, wherein the processor is to be placed in the sleep state.

10. An apparatus comprising:
comparison logic to determine whether a runtime disablement condition is met with respect to a sleep state of a mobile platform, wherein the runtime disablement condition is based on one or more of a false entry rate for the sleep state, an interrupt frequency for the sleep state, or a latency for the sleep state, and wherein the sleep state is selected from one of a plurality of sleep states having different levels that range from shallow to deep;
disablement logic to adaptively disable the sleep state if the runtime disablement condition is met, wherein disabling the sleep state is to remove the sleep state from contention as a selected sleep state to reduce the likelihood that a false entry will occur; and
enablement logic to adaptively enable the sleep state if a runtime reinstatement condition is met, wherein enabling the sleep state is to place the sleep state into contention as a selected sleep state to increase the likelihood that an optimal sleep state is selected.

11. The apparatus of claim 10, wherein the comparison logic is to,
determine a false entry rate for the sleep state, and
compare the false entry rate to an energy-based threshold to determine whether the runtime disablement condition is met, wherein the sleep state is to be disabled if the false entry rate exceeds the energy-based threshold.

12. The apparatus of claim 11, wherein the comparison logic includes a ratio module to determine a ratio of false entries into the sleep state to total entries into the sleep state over a historical period to determine the false entry rate.

13. The apparatus of claim 11, wherein the comparison logic includes a prediction module to predict the false entry rate based at least in part on a previous interrupt arrival pattern.

14. The apparatus of claim 11, wherein the comparison logic is to obtain the energy-based threshold from a lookup table.

15. The apparatus of claim 10, wherein the comparison logic is to,
determine an interrupt frequency for the sleep state, and
compare the interrupt frequency to an interrupt threshold to determine whether the runtime disablement condition is met, wherein the sleep state is to be disabled if the interrupt frequency exceeds the interrupt threshold.

16. The apparatus of claim 10, wherein the comparison logic is to,
determine a latency for the sleep state, and
compare the latency to a latency threshold to determine whether the runtime disablement condition is met, wherein the sleep state is to be disabled if the latency exceeds the latency threshold.

17. The apparatus of claim 10, wherein the sleep state is to be enabled if one or more of a timer has expired, an interrupt frequency falls below a reinstatement threshold, and a workload has been completed.

18. At least one non-transitory machine readable storage medium comprising a set of instructions which, if executed by at least one processor, cause a computer to:
determine whether a runtime disablement condition is met with respect to a sleep state of a mobile platform, wherein the runtime disablement condition is based on one or more of a false entry rate for the sleep state, an interrupt frequency for the sleep state, or a latency for the sleep state, and wherein the sleep state is selected from one of a plurality of sleep states having different levels that range from shallow to deep;
adaptively disable the sleep state if the runtime disablement condition is met, wherein disabling the sleep state is to remove the sleep state from contention as a selected sleep state to reduce the likelihood that a false entry will occur; and
adaptively enable the sleep state if a runtime reinstatement condition is met, wherein enabling the sleep state is to place the sleep state into contention as a selected sleep state to increase the likelihood that an optimal sleep state is selected.

19. The at least one non-transitory machine readable storage medium of claim 18, wherein the instructions, if executed, cause a computer to:
determine a false entry rate for the sleep state; and
compare the false entry rate to an energy-based threshold to determine whether the runtime disablement condition is met, wherein the sleep state is to be disabled if the false entry rate exceeds the energy-based threshold.

20. The at least one non-transitory machine readable storage medium of claim 19, wherein the instructions, if executed, cause a computer to determine a ratio of false entries into the sleep state to total entries into the sleep state over a historical period to determine the false entry rate.

21. The at least one non-transitory machine readable storage medium of claim 19, wherein the instructions, if executed, cause a computer to predict the false entry rate based at least in part on a previous interrupt arrival pattern.

22. The at least one non-transitory machine readable storage medium of claim 19, wherein the instructions, if executed, cause a computer to obtain the energy-based threshold from a lookup table.

23. The at least one non-transitory machine readable storage medium of claim 18, wherein the instructions, if executed, cause a computer to:
determine an interrupt frequency for the sleep state; and
compare the interrupt frequency to an interrupt threshold to determine whether the runtime disablement condition is met, wherein the sleep state is to be disabled if the interrupt frequency exceeds the interrupt threshold.

24. The at least one non-transitory machine readable storage medium of claim 18, wherein the instructions, if executed, cause a computer to:
determine a latency for the sleep state; and
compare the latency to a latency threshold to determine whether the runtime disablement condition is met, wherein the sleep state is to be disabled if the latency exceeds the latency threshold.

25. The at least one non-transitory machine readable storage medium of claim 18, wherein the sleep state is to be enabled if one or more of a timer has expired, an interrupt frequency falls below a reinstatement threshold, and a workload has been completed.

26. A method comprising:
determining whether a runtime disablement condition is met with respect to a sleep state of a mobile platform, wherein the runtime disablement condition is based on one or more of a false entry rate for the sleep state, an interrupt frequency for the sleep state, or a latency for the sleep state, and wherein the sleep state is selected from one of a plurality of sleep states having different levels that range from shallow to deep;

adaptively disabling the sleep state if the runtime disablement condition is met, wherein disabling the sleep state is to remove the sleep state from contention as a selected sleep state to reduce the likelihood that a false entry will occur; and adaptively enabling the sleep state if a runtime reinstatement condition is met, wherein enabling the sleep state is to place the sleep state into contention as a selected sleep state to increase the likelihood that an optimal sleep state is selected.

27. The method of claim 26, wherein determining whether the runtime disablement condition is met includes:
   determining a false entry rate for the sleep state; and
   comparing the false entry rate to an energy-based threshold, wherein the sleep state is disabled if the false entry rate exceeds the energy-based threshold.

28. The method of claim 27, wherein determining the false entry rate includes determining a ratio of false entries into the sleep state to total entries into the sleep state over a historical period.

29. The method of claim 27, wherein determining the false entry rate includes predicting the false entry rate based at least in part on a previous interrupt arrival pattern.

30. The method of claim 27, further including obtaining the energy-based threshold from a lookup table.

* * * * *